UNITED STATES PATENT OFFICE.

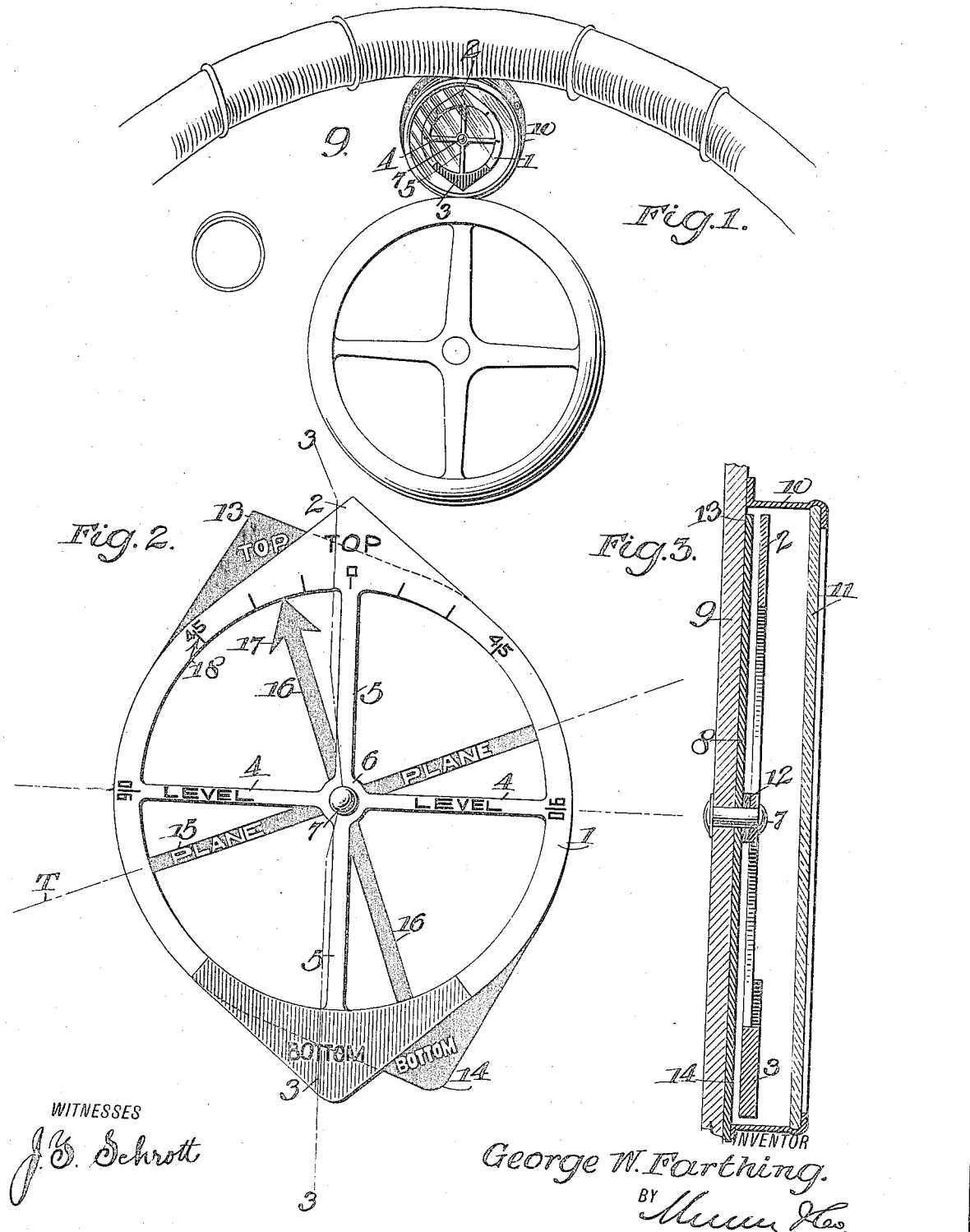

GEORGE W. FARTHING, OF DRY FORK, VIRGINIA.

INCLINOMETER FOR AIRPLANES.

1,301,925.  Specification of Letters Patent.  Patented Apr. 29, 1919.

Application filed March 8, 1918. Serial No. 221,306.

*To all whom it may concern:*

Be it known that I, GEORGE W. FARTHING, a citizen of the United States, and a resident of Dry Fork, in the county of Pittsylvania and State of Virginia, have invented certain new and useful Improvements in Inclinometers for Airplanes, of which the following is a specification.

My invention relates to improvements in inclinometers, being adapted more particularly for use on airplanes, and consists in the constructions, combinations and arrangements herein described and claimed.

An object of my invention is to provide an inclinometer for an airplane, arranged to indicate the amount of deviation of the planes from the horizontal in the lateral directions.

Another object of the invention is to provide an inclinometer adapted to be mounted in the hood or cowl of an airplane, the inclinometer including a plumb ring pivotally mounted and adapted to always remain stationary, the deflection between a pointer carried by the plumb ring and a corresponding pointer back of the ring, indicating the amount of lateral deviation of the planes from the horizontal.

Other objects and advantages will appear in the following specification, reference being had to the accompanying drawing in which:

Figure 1 is a view of a portion of the hood or cowl of an airplane showing the location of the inclinometer.

Fig. 2 is an elevation of the inclinometer the airplane being tilted toward the left; and Fig. 3 is a section on the line 3—3 of Fig. 2.

In carrying out my invention I provide a plumb ring 1 which has a pointer 2 at the top and a weight 3 at the bottom. Horizontal and vertical arms 4 and 5 join the ring with a hub 6 in the middle. A pivot pin 7 passes through the hub 6 and supports the plumb ring.

A base plate 8 is secured on the hood 9 of the airplane in any suitable manner, and the pivot pin 7 passes through all of the parts substantially as shown in Fig. 3. It should be understood that the arrangement of the pivot pin in Fig. 3 illustrates one way of mounting the plumb ring 1. In actual practice the plumb ring 1 and base plate 8 will be made as parts of a separate instrument to be mounted in place as such, instead of passing the pin 7 through the adjacent part of the hood 9.

In the present instance however, the parts of the inclinometer are mounted directly on the hood 9, and a casing 10 with a glass front 11 houses the inclinometer to prevent it from becoming damaged. A washer 12 is interposed between the hub 6 of the plumb ring 1 and the base plate 8. The purpose of this washer is to prevent the binding of either the pointer 2 or weight 3 on the base plate 8 beneath, when the airplane tilts to the front or back. To prevent this binding, the plumb ring 1 is to be made of sufficiently stiff material so that it will not readily flex under the conditions just named.

Corresponding portions of the base plate 8 are adapted to normally coincide with the various parts of the plumb ring 1 and are not intended to make their appearance until the airplane tilts to the right or left. These portions include the top pointer 13 and the bottom pointer 14 which coöperate with the top pointer 2 and the pointer shaped weight 3. Similarly, crossed lines 15 and 16 on the base plate 8 coöperate with the horizontal and vertical arms 4 and 5 respectively. The upper one of the lines 16 has an arrow 17 which is adapted to point to the graduations 18 on the plumb ring 1 to more readily indicate the degrees of deviation of the planes from the horizontal.

The operation of the inclinometer will be readily understood from the foregoing description when taken in connection with the following additional explanation. It is known to those skilled in the art of aviation, that it is desirable and necessary to have the planes normally horizontal. Stabilizing devices of various kinds are intended to automatically right the machine. The inclinometer herein described is intended to give a visible reading of the degrees of deviation of the planes from the horizontal so that the aviator may take steps to bring the planes back to the horizontal, and for this reason the inclinometer is adapted more particularly for use on machines which have no provision for righting the planes.

Fig. 2 shows the planes as having tilted toward the left and into the position T. The base plate 8 with its inscribed devices, correspondingly moves from beneath the plumb ring 1. The distances that these various devices move out of coincidence with the corresponding parts of the plumb ring, readily indicate to the aviator how much the planes of the machine deviate from the horizontal. It should be observed that while the plumb ring 1 is movable with respect to the machine itself, yet it is really the base plate 8, a part of the machine, which is the movable member. The weight 3 at the bottom always keeps the plumb ring 1 in one position. Suitable legends are printed or otherwise placed on the various parts of the inclinometer as indicated in Fig. 2.

One of the distinguishing features of the invention is, that the amount of deviation of the planes is made known to the aviator, in the direction in which the deviation actually occurs. In other words the displacement of the crossed rulings from the corresponding arms 4 and 5 of the plumb ring in Fig. 2 indicates at once that the planes are out of the horizontal and are tilted toward the left. The knowledge of the actual position of the planes as regards the amount of inclination and the direction thereof, is imparted simultaneously.

While the construction and arrangement of the inclinometer as illustrated is that of a generally preferred form, obviously modifications and changes may be made without departing from the spirit of the invention or the scope of the claim.

I claim:—

In an inclinometer for airplanes, a base plate arranged to be mounted on the airplane, having top and bottom pointers and crossed rulings, a plumb ring mounted over the base plate and including horizontal and vertical arms normally coinciding with the crossed rulings and terminating in a hub in the center, a top pointer normally coinciding with the top pointer of the base plate, a weight at the bottom normally coinciding with the bottom pointer of the base plate, a pivot pin passing through the hub and supporting the plumb ring, and a washer on the pivot pin between the plumb ring and base plate, to provide a space and prevent the top pointer and bottom weight of the plumb ring from binding on the base plate when the airplane tilts to the front or rear.

GEORGE W. FARTHING.